United States Patent
Gaines

(10) Patent No.: US 6,325,202 B1
(45) Date of Patent: Dec. 4, 2001

(54) INTERCONNECTION FOR A CONVEYOR SYSTEM

(75) Inventor: Doug Gaines, Dundee, OR (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/519,868

(22) Filed: Mar. 6, 2000

Related U.S. Application Data

(60) Provisional application No. 60/166,801, filed on Nov. 22, 1999.

(51) Int. Cl.$^7$ .................................................. B07C 5/00
(52) U.S. Cl. .................................. 198/583; 198/860.2
(58) Field of Search ............................... 198/860.1, 583, 198/860.2, 370.1, 369.1, 609

(56) References Cited

U.S. PATENT DOCUMENTS

| | | |
|---|---|---|
| 2,188,482 | 1/1940 | Parks . |
| 2,325,248 | 7/1943 | Johnstone . |
| 2,365,978 | 12/1944 | Strain . |
| 2,427,080 * | 9/1947 | Wilson ................................ 198/609 |
| 2,481,131 | 9/1949 | Lindsay . |
| 2,630,211 | 3/1953 | Carrier, Jr. et al. . |
| 2,700,472 | 1/1955 | Carrier, Jr. et al. . |
| 2,705,070 | 3/1955 | Carrier, Jr. et al. . |
| 2,843,255 | 7/1958 | Johnson . |
| 2,885,067 | 5/1959 | Morris . |
| 2,899,044 | 8/1959 | Allen et al. . |
| 2,951,581 | 9/1960 | Long et al. . |
| 3,024,663 | 3/1962 | Carrier, Jr. et al. . |
| 3,032,175 | 5/1962 | Thomas . |
| 3,165,197 | 1/1965 | Allen et al. . |
| 3,208,292 | 9/1965 | Austin et al. . |
| 3,287,983 | 11/1966 | Austin et al. . |
| 3,380,572 | 4/1968 | Luger . |
| 3,447,671 | 6/1969 | Schweinfurth . |
| 3,528,541 | 9/1970 | Barton et al. . |
| 3,552,545 | 1/1971 | Hartman . |
| 3,605,996 | 9/1971 | Holman . |
| 3,648,862 | 3/1972 | Sugimoto . |
| 3,659,465 | 5/1972 | Oshima et al. . |
| 3,702,655 * | 11/1972 | Cox ..................................... 198/609 |
| 3,706,372 | 12/1972 | Musschoot . |
| 3,716,130 | 2/1973 | Morris . |
| 3,750,866 | 8/1973 | Musschoot . |
| 3,796,299 | 3/1974 | Musschoot . |
| 3,917,050 * | 11/1975 | Gregor ............................. 198/369.1 |

(List continued on next page.)

Primary Examiner—Christopher P. Ellis
Assistant Examiner—Rashmi Sharma
(74) Attorney, Agent, or Firm—Chernoff, Vilhauer, McClung & Stenzel, LLP

(57) ABSTRACT

An interconnection for a modular support for a conveyor system includes a first modular frame suitable to support a conveyor and the first modular frame includes a first frame member defining a first cavity therein. A first opening is defined by a first cavity. A second opening opposes the first opening defined by the first cavity. A second modular frame is suitable to support the conveyor and the second modular frame includes a second frame member defining a second cavity therein. A third opening is defined by the second cavity. A fourth opening opposes the first opening defined by the second cavity. A securement structure passes through the first opening and the third opening to rigidly interconnect the first frame member with respect to the second frame member. A first cover is detachably engageable with the first frame member in such a manner as to at least partially overlay the second opening. A second cover is detachably engageable with the second frame member in such a manner as to at least partially overlay the fourth opening.

8 Claims, 7 Drawing Sheets

U.S. PATENT DOCUMENTS

| | | |
|---|---|---|
| 4,088,223 | 5/1978 | Bertrand . |
| 4,149,627 | 4/1979 | Dumbaugh et al. . |
| 4,162,778 | 7/1979 | Kraft . |
| 4,216,416 | 8/1980 | Grace . |
| 4,218,929 | 8/1980 | Surplin . |
| 4,260,052 | 4/1981 | Brown . |
| 4,313,535 | 2/1982 | Carmichael . |
| 4,378,064 | 3/1983 | Brown . |
| 4,441,060 | 4/1984 | Hamer et al. . |
| 4,496,884 | 1/1985 | Hamer et al. . |
| 4,813,532 | 3/1989 | Harper . |
| 5,054,606 | 10/1991 | Musschoot . |
| 5,080,218 | 1/1992 | Izume et al. . |
| 5,127,512 | 7/1992 | Frölich et al. . |
| 5,183,143 * | 2/1993 | Sullivan, Jr. ............ 198/370 |
| 5,207,310 * | 5/1993 | Maddocks ............ 198/370 |
| 5,211,277 * | 5/1993 | Mount ............ 198/358 |
| 5,213,200 | 5/1993 | Fishman et al. . |
| 5,409,101 | 4/1995 | Ahmed et al. . |
| 5,868,241 | 2/1999 | Pellegrino . |

* cited by examiner

INTERCONNECTION FOR A CONVEYOR SYSTEM

This application claims the benefit of U.S. Provisional Application No. 60/166,801, filed Nov. 22, 1999.

BACKGROUND OF THE INVENTION

The present invention relates to an interconnection for different portions of a modular conveyor assembly.

Traditionally conveyor systems have been constructed as a single unitary system, where the product is conveyed between different locations as desired. Unfortunately, such a system is difficult to assemble and may require a nearly complete custom design for each installation. In order to decrease the design efforts for each installation and increase flexibility, many conveyor manufacturers design conveyor systems in a modular fashion. Different modular sections of the conveyor system are interconnected together to assemble the complete conveyor system.

There have been many different interconnections developed for the interconnection of the modular sections of a conveyor system. Referring to FIG. 1, one potential solution for the interconnection is to directly weld the adjoining modular sections together, such as at locations 80 and 82. This process involves grinding away the paint in the abutting sections where the modular sections are to be welded together. Then the adjoining sections are welded together where the paint is removed. Thereafter, the weld is grinded to provide a smoother surface. Then the adjoining sections with damaged or removed paint are repainted. Unfortunately, this process involves substantial time to complete, is expensive, may warp the structure, requires alignment and fitting at the customer's location, and fails to provide an aesthetically pleasing result. In addition, a welding machine needs to be located which is not always readily available, especially in South America, together with sufficient electrical power to operate the welding machine. Also, the metal and paint debris as a result of the process needs to be cleaned up after. Moreover, the modular sections are difficult disassemble is there is a need to move or otherwise remove the conveyor system.

Referring to FIGS. 2 and 3, a different interconnection system for a modular conveyor system involves the use of "L" shaped tabs 90 and 92 with holes 94 and 96 drilled therethrough. After arranging the adjoining modular sections, the holes 94 and 96 are drilled through each of the tabs 90 and 92 which insures the accuracy of the placement of the holes. Then the two tabs 90 and 92 are secured together with a nut 99 and bolt 98. This permits the modular sections to be more readily disassembled, is relatively quick to install, and does not require a welding machine and the associated limitations associated therewith. Unfortunately, this process still requires the drilling of holes in the field which increase the difficulty of installation. In addition, the exposed threads of the bolt 98 are difficult to adequately clean which is important for conveyor system that are used for food products. In addition, the threads and nuts tend to build up a layer of dirt and grease which is difficult to remove by simple wiping. Also, operators and other persons in the proximity of the bolt 98 have a tendency to snag clothing or impale themselves on the exposed threads resulting in additional work area hazards.

What is desired, therefore, is an interconnection for a modular conveyor system that does not involve additional machining at the customer's location, does not involve welding, does not require additional clean up as a result of installation, is inexpensive, maintains the structural integrity of the conveyor system, is aesthetically pleasing, is easy to dissemble, is relatively quick to assemble, does not pose an additional work hazard, and is sanitary.

SUMMARY OF THE INVENTION

The present invention overcomes the aforementioned drawbacks of the prior art by providing an interconnection for a modular support for a conveyor system. The system includes a first modular frame suitable to support a conveyor and the first modular frame includes a first frame member defining a first cavity therein. A first opening is defined by said first cavity. A second opening opposes the first opening defined by the first cavity. A second modular frame is suitable to support the conveyor and the second modular frame includes a second frame member defining a second cavity therein. A third opening is defined by the second cavity. A fourth opening opposes the first opening defined by the second cavity. A securement structure passes through the first opening and the third opening to rigidly interconnect the first frame member with respect to the second frame member. A first cover is detachably engageable with the first frame member in such a manner as to at least partially overlay the second opening. A second cover is detachably engageable with the second frame member in such a manner as to at least partially overlay the fourth opening.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
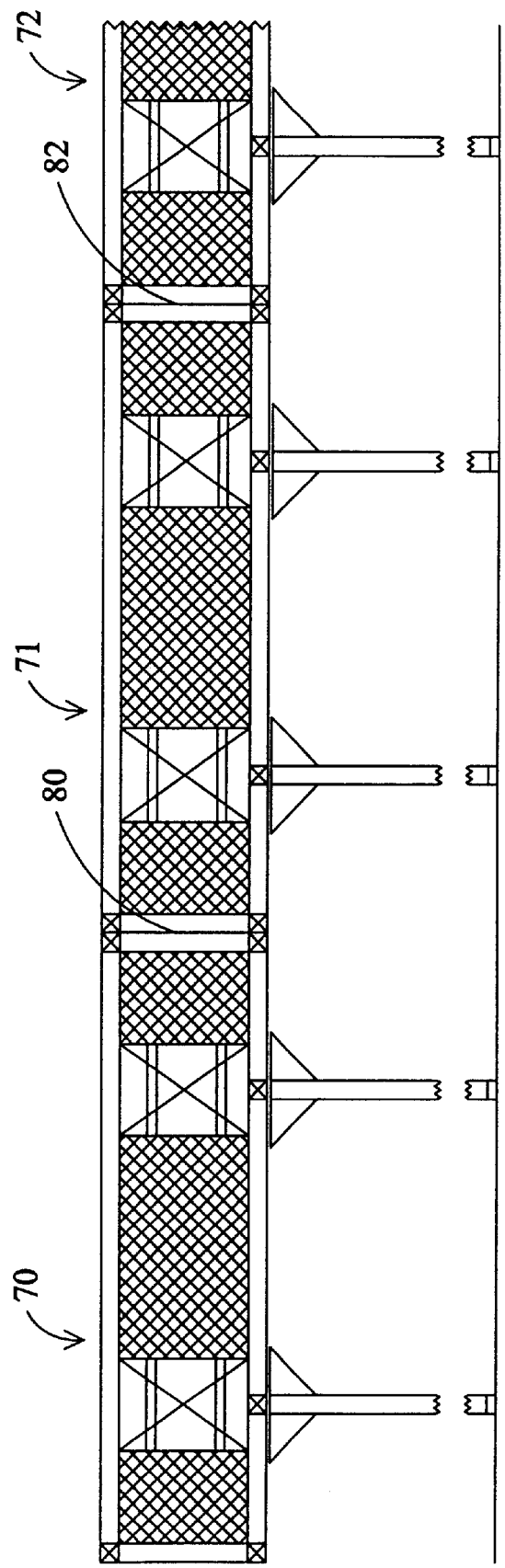
FIG. 1 is an interconnection structure for modular sections of a conveyor system.
Figure 2:
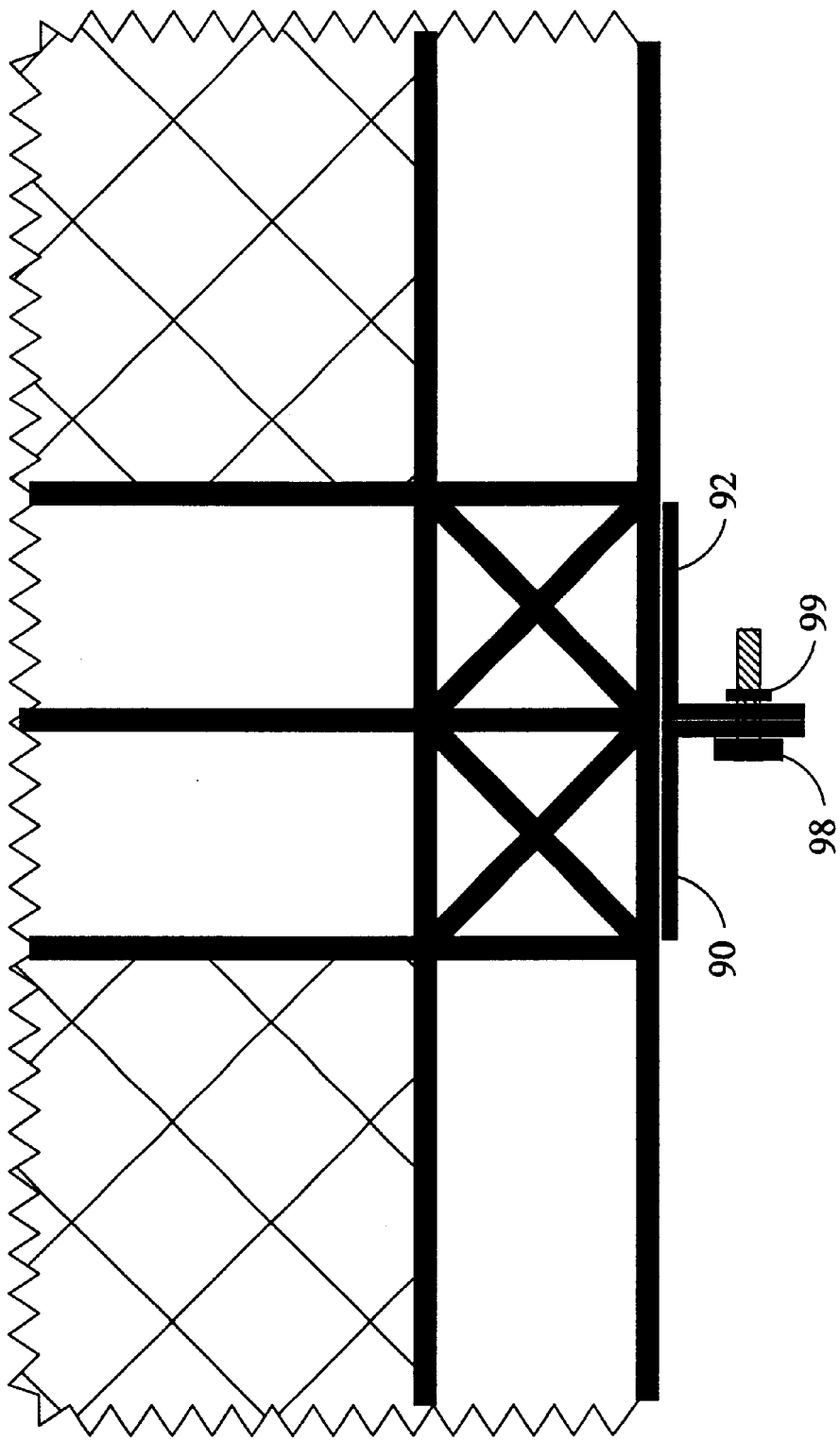
FIG. 2 is a partial view of another interconnection structure for modular sections of a conveyor system.
Figure 3:
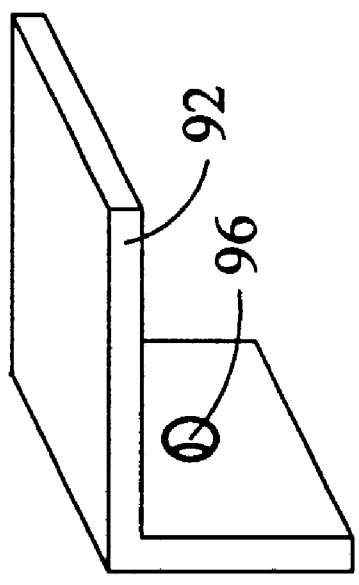
FIG. 3 is a perspective view of part of the interconnection structure of FIG. 2.
Figure 3:
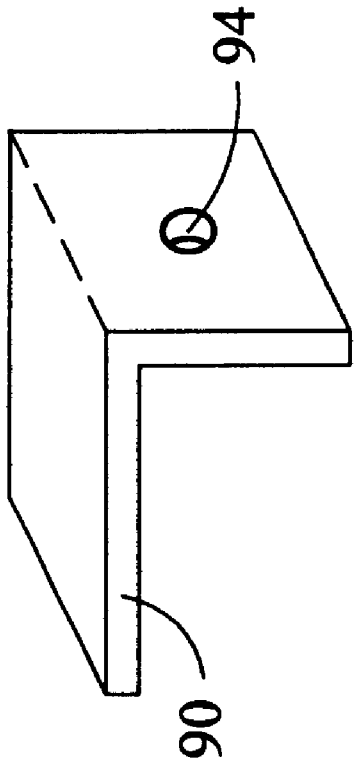
Figure 4:
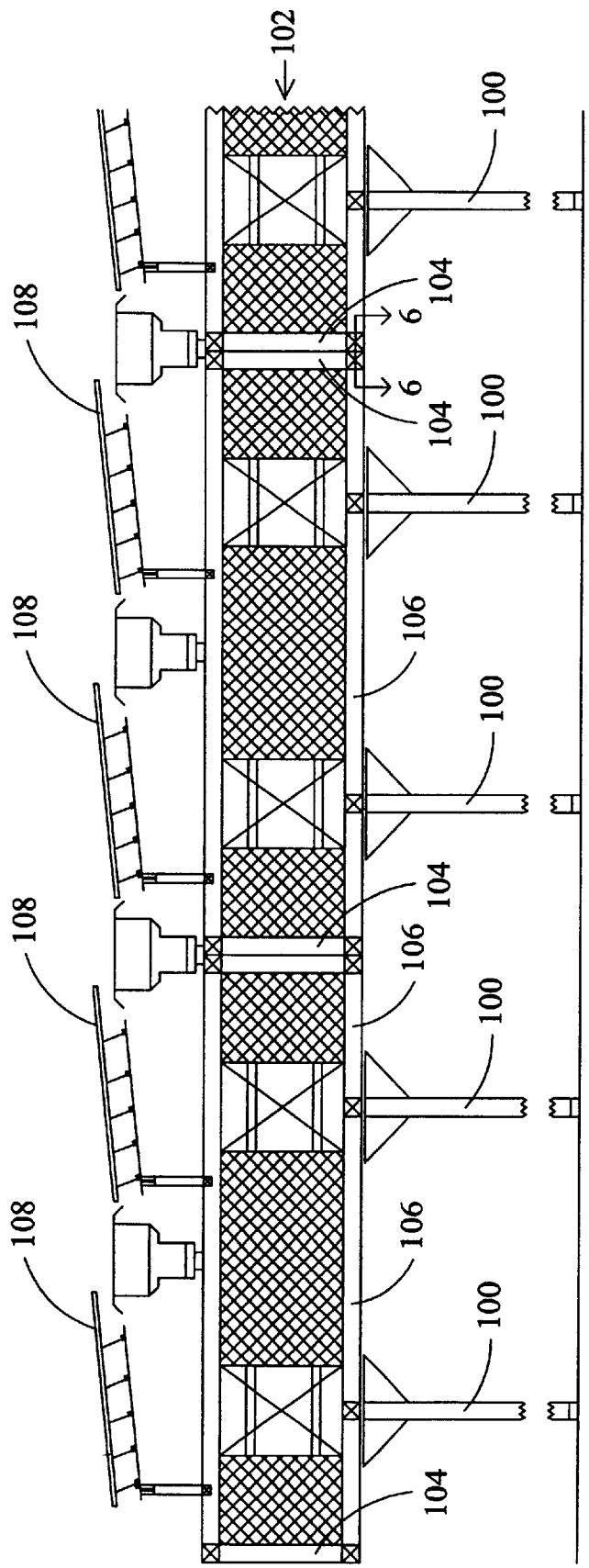
FIG. 4 is a side view of a simplified representation of a conveyor system.
Figure 5:
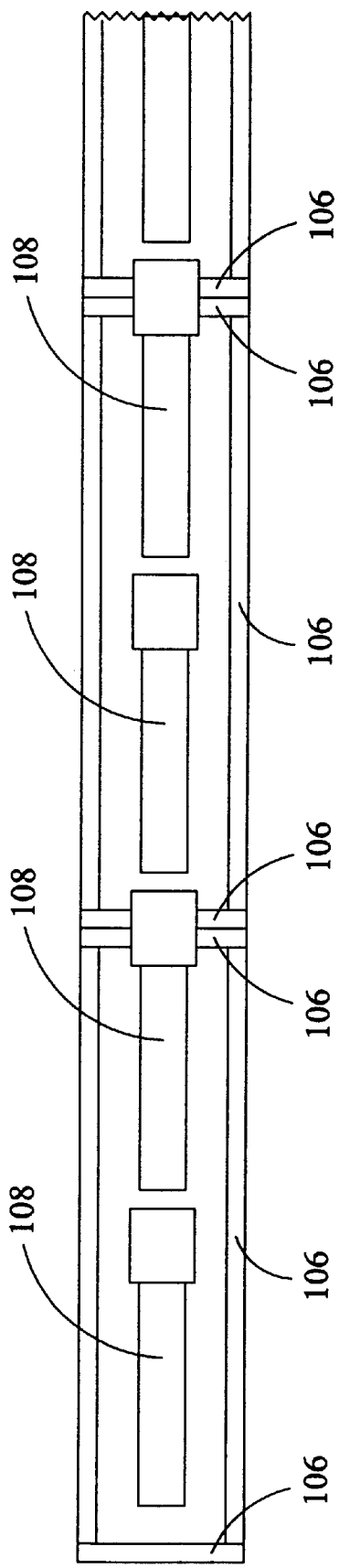
FIG. 5 is a top view of the conveyor system of FIG. 4.

Referring to FIGS. 4 and 5, a conveyor system includes a set of supports 100 supporting a frame 102 thereon. The frame 102 includes a set of upright interconnects 104 and a set of horizontal interconnects 106. The upright interconnects 104 and horizontal interconnects 106 are preferably square tubular. The upright interconnects 104 and horizontal interconnects 106 are interconnected together, such as by welding, in such a manner that they are rigidly interconnected to provide a strong support for the conveyor 108 supported thereon.

Figure 6:
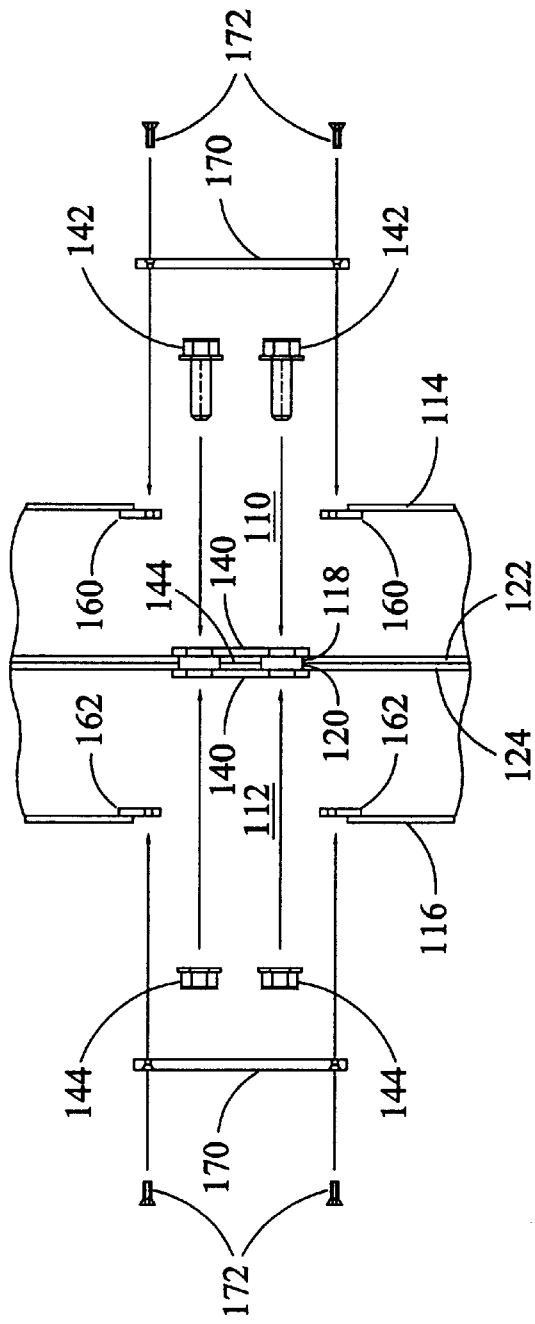
FIG. 6 is a sectional view of an exemplary embodiment of an interconnection system of the present invention.
Figure 8:
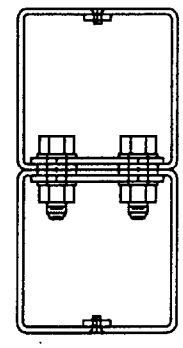
FIG. 8 is an end view of the interconnection system of FIG. 6.
Figure 7:
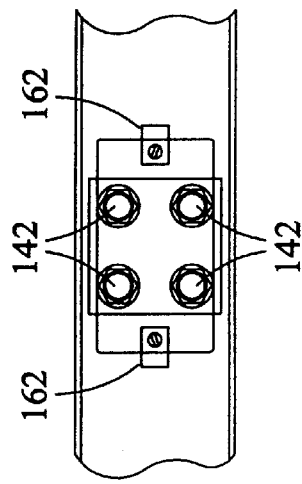
FIG. 7 is a side view of the interconnection system of FIG. 6.

Referring to FIGS. 6, 7, and 8, a pair of adjoining pairs of horizontal interconnects 106 of an adjoining pair of modular sections include a pair of first and second outer openings 110 and 112. The outer openings 110, 112 are cut in the opposing first and second outer surfaces 114 and 116 of the horizontal interconnects 106. A pair of first and second inner openings 118 and 120 are cut in the opposing first and second inner surfaces 122 and 124 of the horizontal interconnects 106. The inner openings 118, 120, and outer openings 110, 112 may be any shape, as desired. The size of the inner opening is preferably smaller than the outer opening. In addition, the different inner openings and outer openings may be different sizes, if desired. The inner openings 118, 120 and outer openings 110, 112 are located in the respective horizontal interconnects 106 such that when the modular sections are aligned the openings are generally aligned. Preferably, the respective inner and outer openings are aligned with one another for ease of assembly.

Figure 9:
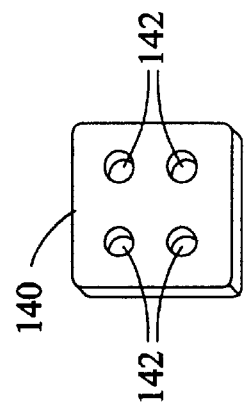
FIG. 9 is an insert for the interconnection system of FIG. 6.

Referring also to FIG. 9, to interconnect a pair of horizontal interconnects 106, a pair of plates 140 with openings 142 therethrough are used. Preferably the surface area of the plate 140 is sized to cover the inner opening that it is secured against. A plate 140 is positioned within each of the horizontal interconnects 106 against the respective inner surface 122, 124. Preferably, the plate 140 is sized in such a manner that it may be inserted within the horizontal interconnect 106 through the respective outer opening 112, 114. A set of four bolts 142 and nuts 144 secure a pair of plates 140 together and hence secure the horizontal interconnects 106 together. The bolts 142 and nuts 144 are secured by using appropriate tools passed through the outer openings 110, 112. Using plates 140 and bolts/nuts is a relatively fast process of securing the horizontal interconnects 106 together. In addition, the plates 140 may be adjusted such that the bolts 142 still pass through the pair of inner openings 118, 120 even if the inner openings 118, 120 are slightly misaligned. This misalignment tolerance is achieved by designing the periphery of the openings 142 to be somewhat smaller than the inner openings 118, 120 which allows for the movement of the plates 140 (with bolts passed therethrough) within the inner openings 118, 120 when the modular sections are interconnected. A reinforcement member 144 may be included between the plates 140 to provide additional support. Alternatively, different detachably connectable interconnection structures may be used to secure adjacent horizontal interconnects 106 together. For example, one alternative structure may include holes drilled in the horizontal interconnects and bolts/nuts secured therethrough. It is to be understood that the interconnections may be provided on any adjacent members that include a cavity therein, such as for example, upright interconnects and tubular interconnects.

A set of tabs 160 and 162 are rigidly attached to the horizontal interconnects 106 extending into the respective outer opening 112, 114. Each of the tabs 160, 162 include a threaded opening therethrough. A pair of cover plates 170 are inserted within the respective outer opening 110, 112 and supported by respective tabs 160, 162. A set of screws 172 secure the cover plates 170 to the tabs 160, 162. The thickness of the cover plates 170 preferably match the recess provided by the tabs 160, 162 so that the exterior surface of the cover plates 170 is co-planar with the respective outer surfaces 114, 116. It is to be understood that alternative cover structures may be used, as desired.

It is readily realizable that the securement structure of the horizontal interconnects 106 completely encloses the bolts/nuts so that no dirt will accumulate on the nuts/bolts that requires periodic cleaning. In addition, the bolts/nuts do not pose a safety hazard to operators or other persons near the interconnection. The cleaning of the resulting exterior surface is simply a matter of wiping down the conveyor system, as if the securement structure was not present. In addition, no accurate alignment, drilling, power tools, and welding machines are necessary to accomplish the securement of the horizontal interconnections 106 together. Also, the interconnection is quick to perform when assembling the modular sections.

Figure 11:
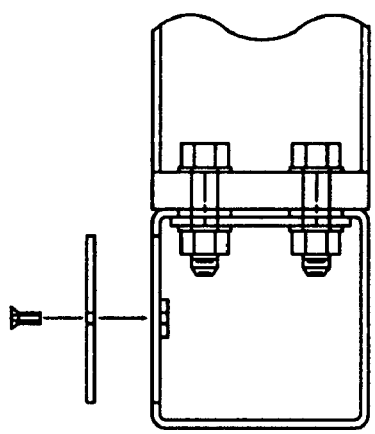
FIG. 11 is an end view of the interconnection system of FIG. 10.
Figure 10:
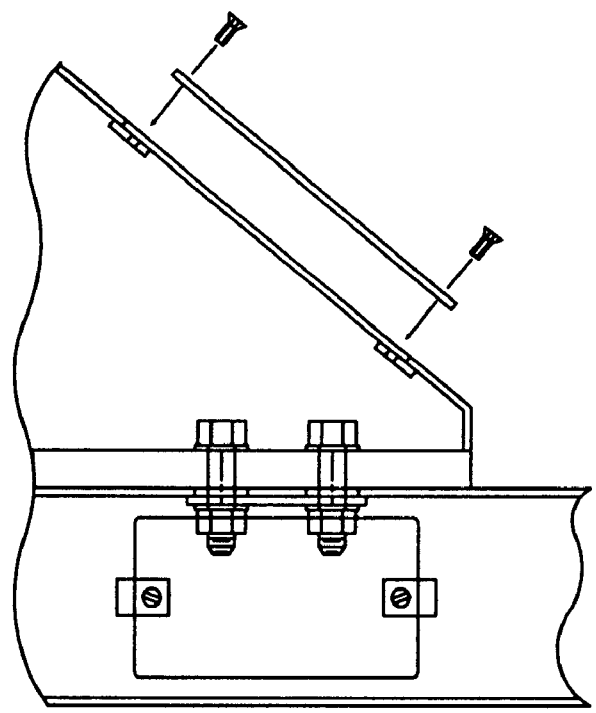
FIG. 10 is a sectional view of another embodiment of an interconnection system of the present invention.

In a similar manner the angled portions of the supports 100 may be attached to the frame 102, as illustrated in FIGS. 10, 11, and 12. In this manner the interconnection of the supports 100 may be performed in a modular fashion without the same aforementioned drawbacks with regard to the horizontal interconnections 106. In addition, such an interconnection of the supports provides the same advantages as the interconnection of the horizontal interconnections 106.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. An interconnection for a modular support for a conveyor system comprising:
 (a) a first modular frame suitable to support a conveyor, said first modular frame including a first frame member defining a first cavity therein;
 (b) a first opening defined by said first cavity;
 (c) a second opening opposing said first opening defined by said first cavity;
 (d) a second modular frame suitable to support said conveyor, said second modular frame including a second frame member defining a second cavity therein;
 (e) a third opening defined by said second cavity;
 (f) a fourth opening opposing said first opening defined by said second cavity;
 (g) a securement structure passing through said first opening and said third opening to rigidly interconnect said first frame member with respect to said second frame member;
 (h) a first cover detachably engageable with said first frame member in such a manner as to at least partially overlay said second opening; and
 (i) a second cover detachably engageable with said second frame member in such a manner as to at least partially overlay said fourth opening.

2. The securement structure of claim 1 further comprising:
 (a) a first plate with a surface sized greater than said first opening;
 (b) a second plate with a surface sized greater than said third opening; and
 (c) a securement member attached to said first and second plates and passing through said first and third openings such that said first plate is in a first pressing engagement with said first frame member and said second plate is in a second pressing engagement with said second frame member.

3. The securement structure of claim 2 wherein said first pressing engagement positions said first plate to completely cover said first opening, and said second pressing engagement positions said second plate to completely cover said third opening.

4. The securement structure of claim 3 wherein said first plate defines at least one fifth opening therethrough and said second plate defines at least one sixth opening therethrough.

5. The securement structure of claim 4 wherein said securement member includes at least one bolt.

6. The securement structure of claim 2 further comprising a third plate interposed between said first plate and said second plate.

7. The interconnection of claim 1 wherein said first cover is substantially flush with the exterior surface of said first frame member proximate said second opening when engaged therewith.

8. The interconnection of claim 7 wherein said second cover is substantially flush with the exterior surface of said second frame member proximate said fourth opening when engaged therewith.

\* \* \* \* \*